Oct. 18, 1966  E. S. NIEWIAROWICZ  3,279,768
AERATORS FOR CONFINED LIQUIDS
Filed Feb. 10, 1964  2 Sheets-Sheet 1
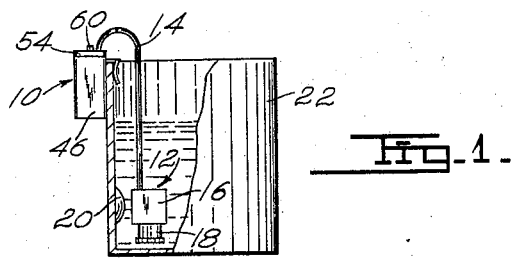
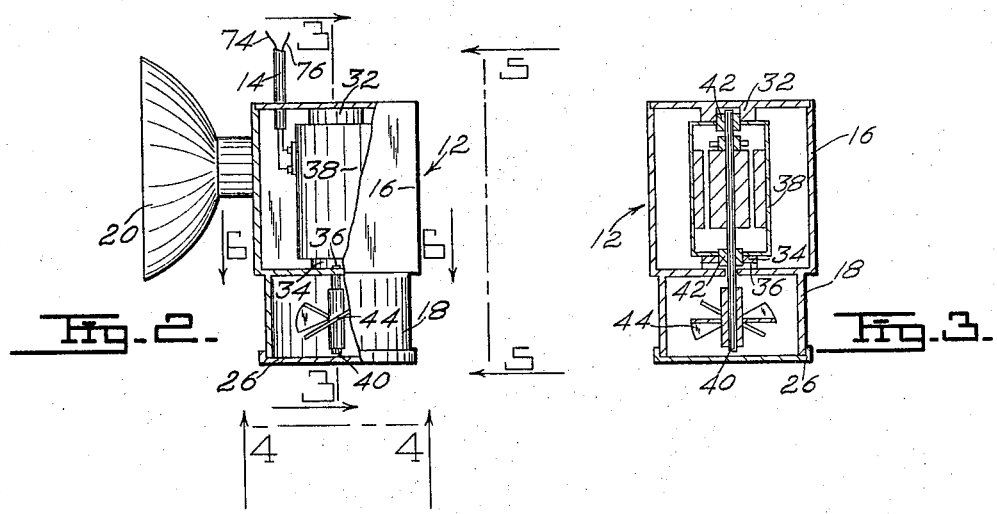
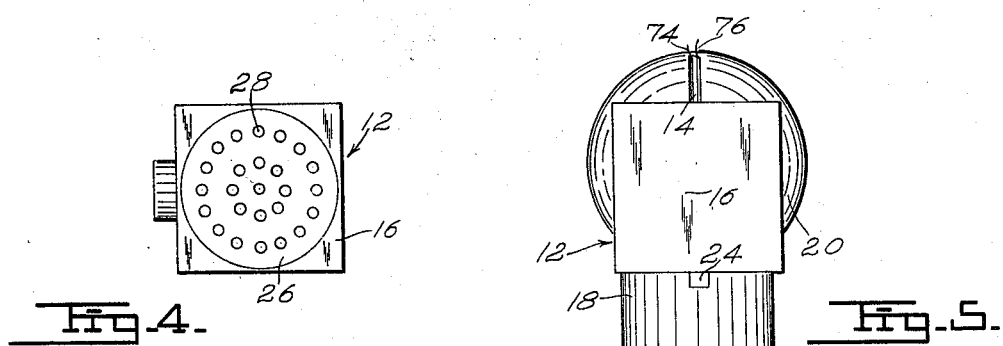
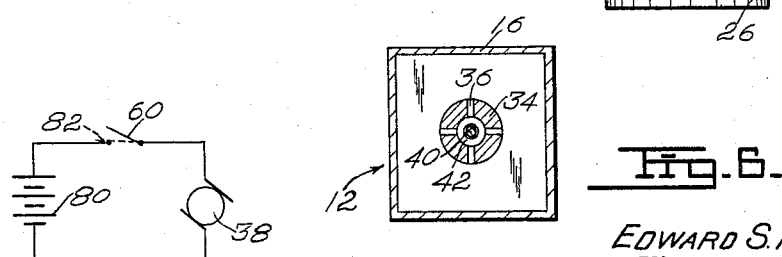
INVENTOR.
EDWARD S. NIEWIAROWICZ
BY
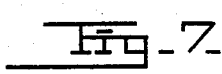
ATTORNEY Oct. 18, 1966    E. S. NIEWIAROWICZ    3,279,768
AERATORS FOR CONFINED LIQUIDS Filed Feb. 10, 1964    2 Sheets-Sheet 2

INVENTOR.
EDWARD S. NIEWIAROWICZ
BY
ATTORNEY

# United States Patent Office 3,279,768
Patented Oct. 18, 1966

3,279,768
AERATORS FOR CONFINED LIQUIDS
Edward S. Niewiarowicz, 29 W. Auburn, Ecorse, Mich.
Filed Feb. 10, 1964, Ser. No. 343,610
2 Claims. (Cl. 261—29)

This invention relates generally to aerators for confined liquids, and more particularly to a portable type of aerator, suitable for use in minnow buckets and aquariums.

Fishermen and aquarium owners alike, both experience extreme difficulty in keeping their minnows and fish alive and active, especially during warm weather. The problem is principally that of replenishing the supply of air in the water of the bucket or tank as it is depleted. To do this most effectively, the rate of aeration should correspond substantially to the rate at which the supply of air is being exhausted. In this way the air content of the water remains nearly constant, and the fish stay alive and active indefinitely.

Fully cognizant of the problem of aerating aquariums, minnow buckets and fish tanks, the applicant has as the primary object of his invention, the provision of an aerator which is compact, conveniently portable and extremely efficient and effective in its operation.

Another object of the invention is to provide a device of the type previously described, which is relatively inexpensive to produce, and extremely simple to install and operate.

A further object of the invention is to provide a device of the type previously described, which is rugged in construction, and is very easy to maintain and service.

Additional features and advantages of the invention will become apparent after consideration of a detailed discussion of the same composed with reference to the accompanying drawings constituting a portion of this application, and in which:

FIGURE 1 is an elevation view of the applicant's device reduced in size, with a portion of the container broken away to show the location of the circulator unit within the container.

FIGURE 2 is an elevation view of the circulator unit with a portion of the housing broken away to show the motor and impeller compartments.

FIGURE 3 is a section view taken substantially on plane 3—3 in FIGURE 2, showing the mounting bushings for the electric motor.

FIGURE 4 is a plan view taken substantially on plane 4—4 in FIGURE 2, showing the guard cap on the cylindrical section of the housing.

FIGURE 5 is an elevation view taken substantially on plane 5—5 in FIGURE 2, showing the square discharge opening in the cylindrical section of the housing.

FIGURE 6 is a section view taken substantially on plane 6—6 in FIGURE 2, showing the spaced radial ports in the lower mounting bushing.

FIGURE 7 is a schematic wiring diagram showing the manner in which the electrical components of the applicant's device are connected.

Figure 8:
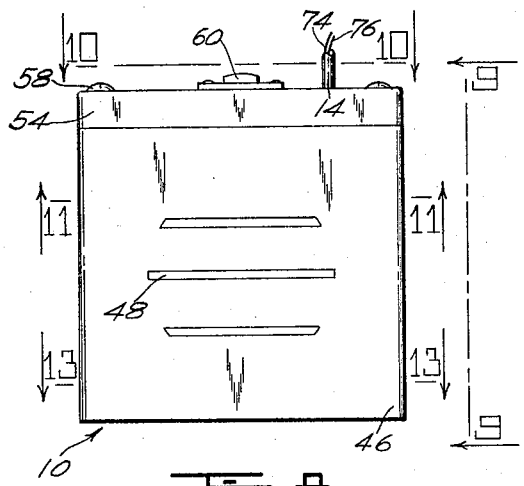
FIGURE 8 is an elevation view of the battery case, showing the lateral openings in the side.
Figure 9:
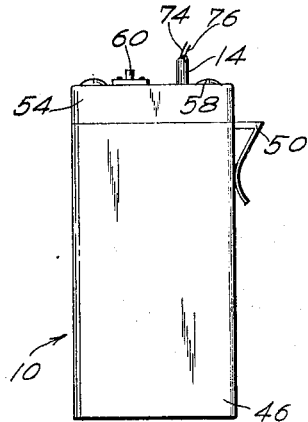
FIGURE 9 is a view taken substantially on plane 9—9 in FIGURE 8, showing the resilient clip on the back of the battery case.
Figure 10:
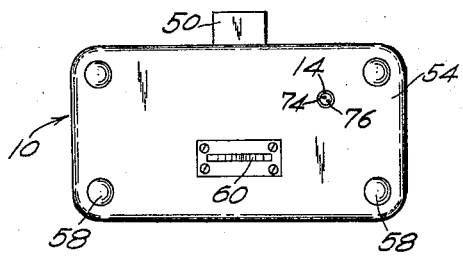
FIGURE 10 is a plan view taken substantially on plane 10—10 in FIGURE 8, showing the location of the electrical switch in the removable cover of the battery case.
Figure 11:
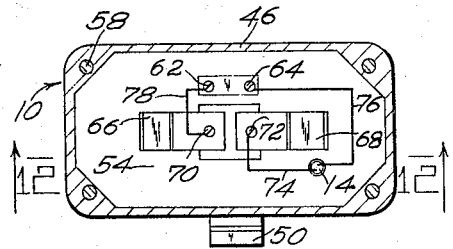
FIGURE 11 is a section view taken substantially on plane 11—11 in FIGURE 8, showing electrical connections of the resilient contacts on the removable cover of the battery case.
Figure 12:
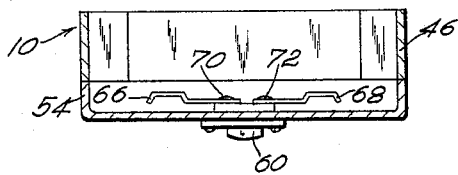
FIGURE 12 is a section view taken substantially on plane 12—12 in FIGURE 11, showing the characteristic shape of the resilient contacts on the removable cover.

For a detailed description of the invention, reference is made to the drawings in which numeral 10 designates a rectangular battery case, which is physically connected to a circulator unit 12 by means of a flexible tubular member 14 made of plastic or other water impervious material. The circulator unit 12 consists of a housing having a substantially square upper section 16, and a lower cylindrical section 18.

A resilient vacuum cup 20 is mounted on the upper section 16 of the housing for removably attaching the circulator unit 12 on the inner surface of a container 22 as shown in FIGURE 1. A square opening 24 is provided on one side of the cylindrical section 18 of the housing, and a guard cap 26 with circular ports 28 therein, is removably applied on the lower end of the cylindrical section 18. Upper and lower mounting bushings 32 and 34 respectively are formed integral with the housing on the inner surface of the upper section 16.

Four spaced radial ports 36 are provided in the lower mounting bushing 34. A miniature direct current electric motor 38, having a shaft 40 rotatably supported in anti-friction bearings 42, is mounted in the upper section 16 of the housing. The bearings 42 of the electric motor 38 are secured in the top and bottom seating bushings 32 and 34 respectively. The shaft 40 of the electric motor 38 extends into the lower cylindrical section 18 of the housing. A multi-vane impeller 44 is removably attached on the lower end of the shaft 40 on the electric motor 38.

The battery case 10 has a lower portion 46 with elongated lateral openings 48 in one side thereof, and a downwardly disposed spring clip 50 on the opposite side. An elongated resilient contactor 52 is permanently mounted in the bottom of the battery case 10. A cover 54 is removably mounted on the lower portion 46 of the battery case 10 by means of screws 58. A single pole electric switch 60, having a pair of terminal screws 62 and 64, is detachably mounted in the cover 54. Two insulated resilient contactors 66 and 68, having binder screws 70 and 72 respectively, are mounted on the lower side of the cover 54.

A pair of electrical conductors 74 and 74 are inserted through the flexible tubular member 14 and connected to the electric motor 38 in the housing of the circulator unit 12. The other ends of the electrical conductors 76 and 74 are connected respectively to terminal screw 64 on the electric switch 60 and the binder screw 72 on the resilient contactor 68. An electrical conductor 78 is connected between the other terminal screw 62 of the electric switch 60 and the binder screw 70 on the resilient contactor 66.

The previous discussion completes a detailed description of the structure characterizing the applicant's invention; however, to provide a more thorough understanding of the subject matter herein presented, a brief discussion will be directed to the manner in which the applicant's aerator operates in performing its intended function.

Figure 13:
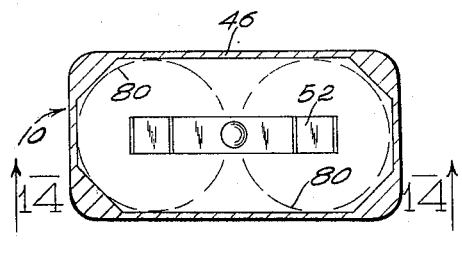
FIGURE 13 is a section view taken substantially on plane 13—13 in FIGURE 8, showing the resilient contacts in the bottom of the battery case, and the position to be occupied by the batteries.
Figure 14:
FIGURE 14 is a section view taken substantially on plane 14—14 in FIGURE 13, showing the characteristic shape of the resilient contacts in the bottom of the battery case.

In use, a pair of one and one-half volt standard type "D" dry cell batteries 80 are placed in the lower portion 46 of the battery case 10, as indicated in FIGURE 13, so as to rest on the elongated resilient contactor 52. The cover 54 is then placed on the lower portion 46 of the battery case 10, and the screws 58 tightened so as to secure the cover 54 in position, and bring the two insulated resilient contacts 66 and 68 into intimate contact with the upper battery terminals, not here shown.

The circulator unit 12 is then attached to the inner surface of the container 22, holding the water to be aerated, by means of the resilient vacuum cup 20, as illustrated in FIGURE 1. The battery case 10 is suspended from the upper rim of the container 22 by means of the spring clip 50. The electric switch 60 on the cover 54 is then closed, by shifting it to the broken line position 82 shown in FIGURE 7. This closes the circuit to the electric motor 38, as shown diagrammatically in FIGURE 7, thus causing it to rotate in a clockwise direction as viewed from the impeller end of the shaft 40.

Air is thereby drawn through the lateral opening 48 in the side of the battery case 10, through the flexible tubular member 14 and into the upper section 16 of the housing. The air then enters the radial ports 36 in the lower mounting bushing 34, and passes around the rotatable shaft 40 of the electric motor 38 and into the cylindrical section 18 of the housing. Here the air is mixed with the water and forced through the openings 28 in the guard cap 26 by action of the impeller 44. Water is drawn through the square opening 24 in the cylindrical section 18 of the housing. This purpose of aeration may be continuous or intermittent as desired, depending upon the volume of water to be aerated by the unit.

Based upon the foregoing discussion, the applicant is of the opinion that his invention has fulfilled a long-felt need in the field of aerators generally, and that he has accordingly made a valuable contribution to the related art. However, while the invention was described with reference to the structural details of a single embodiment, it will be appreciated by those skilled in the art, that the principles involved are susceptible of numerous other practical applications.

Therefore, I claim as new, and desire to secure by Letters Patent:

1. A submersible aerator for use in supplying air to confined liquids, such aerator comprising a housing having an upper and a lower compartment communicating with each other through a central opening, such lower compartment having therein a plurality of openings, an electric motor in the upper compartment having a rotatable shaft extending through the central opening into the lower compartment of the housing, a case having the interior vented to the atmosphere, a source of electrical potential in the case, a hollow conductor between the case and the upper compartment of the housing, electrical conductors in the hollow conductor connecting the source of electrical potential to the electric motor, and an impeller mounted on the rotatable shaft in the lower compartment of the housing, such impeller when in rotation adapted to draw air from the atmosphere through the hollow conductor and mixing it with the confined liquid which it circulates through the openings in the lower compartment of the housing when the latter is immersed.

2. The aerator of claim 1 having a mounting bushing disposed around the central opening supporting the electric motor, such mounting bushing having therein radial ports controlling communication between the upper and lower compartments in the housing.

References Cited by the Examiner
UNITED STATES PATENTS

| | | | |
|---|---|---|---|
| 2,515,538 | 7/1950 | Wall. | |
| 2,590,581 | 3/1952 | Shirley | 261—93 |
| 3,035,702 | 5/1962 | Marvin | 210—169 |
| 3,123,652 | 3/1964 | Gross | 261—93 X |
| 3,189,334 | 6/1965 | Bell | 261—121 |

HARRY B. THORNTON, *Primary Examiner.*

T. R. MILES, *Assistant Examiner.*